United States Patent
Bosch et al.

(10) Patent No.: US 9,992,103 B2
(45) Date of Patent: Jun. 5, 2018

(54) METHOD FOR PROVIDING STICKY LOAD BALANCING

(71) Applicant: Cisco Technology, Inc., San Jose, CA (US)

(72) Inventors: Hendrikus G. P. Bosch, Aalsmeer (NE); Peter Weinberger, Wallisellen (CH); Praveen Bhagwatula, Cary, NC (US); Michael E. Lipman, Harvard, MA (US); Alessandro Duminuco, Milan (IT); Louis Gwyn Samuel, Swindon (GB)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 14/162,954

(22) Filed: Jan. 24, 2014

(65) Prior Publication Data

US 2015/0215819 A1 Jul. 30, 2015

(51) Int. Cl.
*H04L 12/721* (2013.01)
*H04W 24/02* (2009.01)

(52) U.S. Cl.
CPC ............ *H04L 45/38* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 6,980,521 B1* | 12/2005 | Jarvis | H04L 45/00 370/238 |
| 7,738,452 B1 | 6/2010 | O'Rourke et al. | |
| 8,117,388 B2* | 2/2012 | Jernigan, IV | G06F 3/0608 711/114 |
| 8,224,966 B2 | 7/2012 | Tate et al. | |
| 8,467,294 B2 | 6/2013 | Raman et al. | |
| 8,650,389 B1* | 2/2014 | Thornewell | H04L 63/0442 709/227 |
| 8,762,534 B1* | 6/2014 | Hong | G06F 9/505 370/389 |
| 9,049,137 B1* | 6/2015 | Markine | H04L 12/18 |
| 2014/0105031 A1* | 4/2014 | McDysan | H04L 45/302 370/242 |
| 2014/0341029 A1* | 11/2014 | Allan | H04L 47/125 370/235 |
| 2014/0372567 A1* | 12/2014 | Ganesh | H04L 67/1002 709/219 |
| 2014/0372616 A1* | 12/2014 | Arisoylu | H04L 67/1002 709/226 |

* cited by examiner

*Primary Examiner* — Jeffrey M Rutkowski
*Assistant Examiner* — Ning Li
(74) *Attorney, Agent, or Firm* — Edell, Shapiro & Finnan, LLC (57) ABSTRACT

Presented herein are techniques to reduce the number of redirected subscriber packet flows while performing sticky hierarchical load balancing. An Nth head end network element may be activated such that a plurality of N head end network elements are active and capable of receiving and processing one or more packet flows. A primary load balancer may then be directed to overwrite a portion of pointers of a hash table in an evenly distributed manner with pointers to the Nth head end network element such that packet flows are forwarded to the Nth head end network element, wherein the hash table retains a static number of entries as the number of head end network elements is modified.

20 Claims, 6 Drawing Sheets

METHOD FOR PROVIDING STICKY LOAD BALANCING

TECHNICAL FIELD

The present disclosure relates to hierarchical load balancing in a network environment.

BACKGROUND

A mobile network is a radio network with given land areas served by at least one transceiver, known as a cell site or a base station. As mobile subscribers send and receive data traffic on the network, data packets may be put through one or more in-line services that perform data analysis and/or manipulation. Some in-line services are stateful, meaning that the services keep track of the state of subscriber flows traveling across them. For example, firewalls and deep packet inspection (DPI) services may maintain state. If a given subscriber flow was to be directed to another path through the mobile network mid-stream, and thus to another set of in-line services, the in-line services may not function properly, and the end-to-end session between mobile subscriber and remote server may fail. Maintaining a given path for a subscriber flow through the network is known as maintaining "stickiness."

DESCRIPTION OF EXAMPLE EMBODIMENTS

Overview

Presented herein are techniques to reduce the number of redirected subscribers while performing sticky hierarchical load balancing. An Nth head end network element may be activated such that a plurality of N head end network elements are active and capable of receiving and processing one or more packet flows. A primary load balancer may then be directed to overwrite a portion of pointers of a hash table in an evenly distributed manner with pointers to the Nth head end network element such that packet flows may be forwarded to the Nth head end network element, wherein the hash table retains a static number of entries as the number of head end network elements is modified.

Example Embodiments

Figure 1:
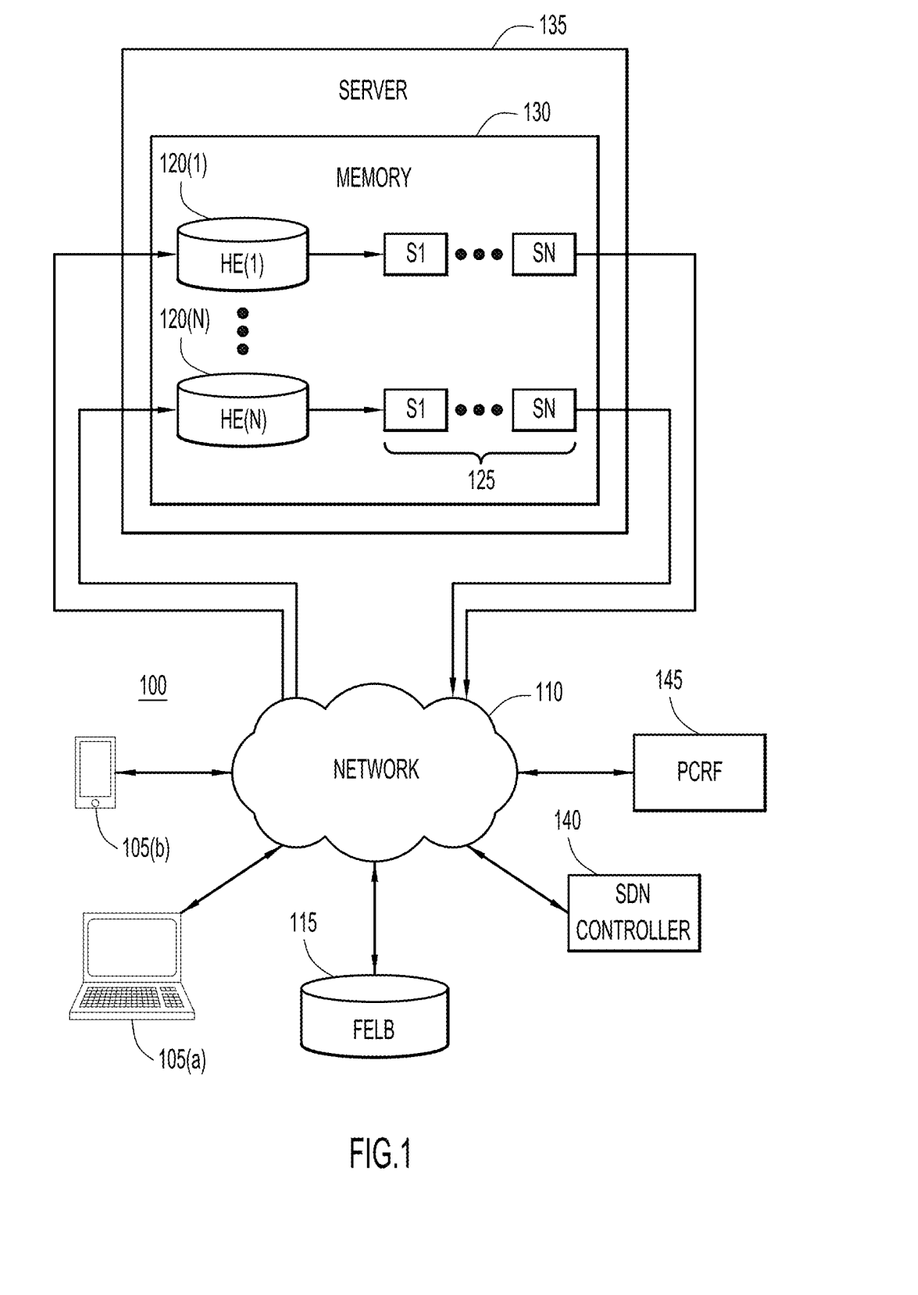
FIG. 1 shows an example system including one or more load balancers in communication with a controller, wherein network elements may be configured with the sticky load balancing capabilities described herein.

Reference is first made to FIG. 1. FIG. 1 shows a hierarchical load balancing system 100 in which mobile subscribers 105(a)-(b) transmit and receive traffic from network 110. Data traffic from mobile subscribers 105(a)-(b) may be forwarded to a front end load balancer (FELB) 115, which may distribute different traffic flows across one or more head ends 120(1)-120(N). The head ends 120(1)-120(N) act as secondary load balancers that may each classify data flows for distribution to one or more in-line services and/or service chains 125. Hence, the head ends 120(1)-120(N) may also be referred to herein as "classifiers," "head end network elements," or "secondary load balancers." The data traffic may then be passed via network 110 to any remote destination. As a result, the FELB 115 may act as a primary load balancer which distributes data flows to a plurality of secondary load balancers, which in turn each distribute data flows to a plurality of in-line service chains 125, thus creating a hierarchical load balancing system 100.

As used herein, the term "load balancer" refers to a router, a switch, or a dedicated service appliance that acts to distribute network or application traffic across a number of network elements. The term "server" includes a software program (e.g., a virtual appliance, virtual machine, etc.), or the computer on which that program executes, that provides a specific kind of service to client software executing on the same computer or on other computers communicating over a network (e.g., network 110). Computers can include any device capable of performing binary and logical computing, including mobile smart phones, desktop computers, laptop computers, tablet computers, and associated processors. The term "mobile subscriber" may include any mobile electronic device (e.g., cellular phone), client, server, peer, service, application, or other mobile (e.g., non-stationary) object capable of sending, receiving, or forwarding information over communications channels in a network. The term "subscriber flow" may refer to data traffic sent and received by a given mobile subscriber.

In some embodiments, load-balancers 115 and 120(1)-120(N) can include load balancing software applications executing in one or more routers or switches in network 110. In other embodiments, load-balancer(s) 115 and 120(1)-120(N) can include dedicated hardware service appliances dedicated to performing load balancing and connected to one or more routers or switches in network 110. In yet other embodiments, load-balancer(s) 115 and 120(1)-120(N) can include a suitable combination of hardware and software modules executing in an appropriate network element in network 110. The load-balancers may be simple network elements that can include computers, network appliances, servers, routers, switches, gateways, bridges, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In prior techniques, data flows in, for example, a mobile network would arrive at a physical network element for classification. For example, packets from a mobile device may arrive at a gateway general packet radio service support node (GGSN) or a packet data network gateway (PGW), be classified as needing video optimization, and be sent to the appropriate in-line service chain. In techniques presented herein, the FELB 115 may be a physical network element, while head ends 120(1)-120(N) may be virtual machines, residing in memory 130 on a physical server 135, capable of performing the functions of hardware load balancers. Since head ends 120(1)-120(N) may be software, additional virtual machines may be dynamically instantiated by a software defined networking (SDN) controller 140 to allow for increased vertical scaling, i.e. capacity adjustment. Further, SDN and other virtualization tools allow for increased horizontal scaling by easily adding additional appliances. In contrast with traditional solutions using entirely hardware load balancers, hierarchical load balancing using virtual network elements allows for in-line service chains that are "perfectly balanced" in that resources allocated may precisely match the capacity required. This distribution of data across a series of secondary load balancers helps balance the capabilities of memory-constrained hardware-based forwarders versus the capabilities of bandwidth-constrained software-based forwarders executing in data centers on regular, empirically programmed, processors. The former provides the bandwidth, while the latter provides subscriber-based routing and steering of packets through a multiplicity of in-line services.

Software-defined networking (SDN) is a networking approach in which control is decoupled from hardware and given to a software application. The SDN controller 140 may operate from a physical computing device or from a virtual or cloud-based computing resource. SDN controllers manage network elements using protocols and standards to allow controllers to instruct and configure network elements how to process and route packets. An administrator using the SDN controller can change any network element's rules using application programming interface (API) calls, and may prioritize, de-prioritize and block specific types of packets across the network. Virtual machines and in-line services, including head ends and service chains, may be created by administrators or automatically using SDN controller software.

FIG. 1 shows that head ends 120(1)-120(N) are virtual machines, while FELB 115 may be a physical network element, both of which may receive and forward traffic in network 110 via SDN API layers. The head ends 120(1)-120(N) are depicted on the same physical server 135, although any number of head ends may be present on any number of physical servers. Similarly, in-line services 125 may be in any number and associated with any number of head ends. The FELB 115 may also be virtual, and may be present in any number in the system 100. Just as network traffic from a mobile subscriber to a remote server may pass through a FELB 115, to one or more head ends 120(1)-120(N) and to one of any number of in-line service chains 125, network traffic may also be received from a remote server into a FELB 115, to one of any number of head ends 120(1)-120(N), and to one or any number of in-line service chains 125 before being forwarded to an associated mobile subscriber. In this process, each head end may classify a data flow and forward the data flow to an appropriate service chain of one or more service chains based upon that classification. Further, while FIG. 1 illustrates a two-tier hierarchical load balancing system, additional load balancing levels may be added, such that head ends 120(1)-120(N) act as secondary load balancers and may each forward subscriber flows to one or more tertiary load balancers, etc.

Each head end 120(1)-120(N) operates by maintaining a Policy and Charging Rules Function (PCRF) subscriber state that is loaded into the head end using, for example, diameter and/or radius protocols (e.g. $3^{rd}$ Generation Partnership Project (3GPP) TS 29.213 protocol). Each head end may load the policy state from the PCRF upon receiving a first-sign-of-life (FSOL) packet from a given subscriber flow.

The network topology illustrated in FIG. 1 is simplified for ease of illustration, and may include any suitable topology, including tree, ring, star, bus, etc. in various embodiments. For example, the network may comprise Transparent Interconnection of Lots of Links (TRILL) network, access/edge/core network, etc. The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

As discussed above, subscriber flows may be made "sticky" i.e. sent to the same in-line service chain 125 consistently. This may be desirable because certain in-line services may maintain state, either in the application layer or in the transport layer, and because in-line services may not be completely transparent. If a subscriber flow were to be redirected mid-stream, it could cause the in-line services to malfunction, or even cause the connection from mobile subscriber to remote server to fail. Additionally, subscriber flows changing paths can cause jitter (packets arriving out of order). Deep packet inspection (DPI) services may maintain state, as may firewall services. DPI services examine the data portion (and even the header portions) of packets searching for protocol non-compliance, viruses, spam, etc. Stateful firewall services keep track of the state of network connections such as Transmission Control Protocol (TCP) streams, User Datagram Protocol (UDP) communications traveling across it, etc. The firewall will block connections that are not known to be active. Examples of in-line services which are not transparent include TCP proxies, Hypertext Transfer Protocol (HTTP) proxies, network address port translation (NAPT) services and others. A non-transparent proxy is a proxy that modifies data packets in order to provide some added service to the user.

To accomplish stickiness, a hashing function may be performed on the Internet Protocol (IP) address or other unique identifier of the mobile subscriber device at the FELB 115. In example embodiments, FELB 115 may implement hash-based equal cost multi path (ECMP) techniques over mobile subscriber 105($b$)'s source IP address, or source IP address combined with protocol parameters (or other suitable hashing algorithm parameters), to determine the appropriate second stage load-balancer 120(1). ECMP is a routing strategy where next-hop packet forwarding to a single destination can occur over multiple "best paths" which tie for top place in routing metric calculations. The hashing function may produce mappings to buckets (entries) in a hash table on the FELB, where each bucket contains a pointer to a head end 120(1)-120(N). The number of hash buckets over which ECMP load balances may be determined by a number N of head ends 120(1)-120(N). Thus, a per-session routing scheme is achieved which maintains stickiness. Further, the hashing function ensures that the FELB mechanically distributes subscriber flows to the head ends substantially evenly, thereby balancing traffic flow in the system 100.

The hashing function may hash upstream flows (i.e., towards the Internet) by the source IP address of a packet, while downstream flows may be hashed by the destination IP address. While a hashing function may be performed on the entire IP address or other subscriber flow identifier, the head ends may be sufficiently low in number that the hash may be performed on only a portion of the IP address bits. For example, the hashing function may be applied to the lowest six bits of the IP address for packets in all subscriber flows.

A problem arises when changing the number of head ends 120(1)-120(N), either intentionally or due to head end failure. The hashing technique described above may use modulo N arithmetic, where N is the number of head ends. This ensures that all subscriber flows are directed to one of the N head ends. However, if a new head end is instantiated and added to head ends 120(1)-120(N), the hashing function must now apply modulo N+1 arithmetic. For example, in the case of two head ends, the hashing function may use modulo 2 arithmetic to evenly distribute subscriber flows. But if a third head end is added, the hashing function will now apply modulo 3 arithmetic. This will cause a substantial number of subscriber flows to be redirected, which may cause a loss of state for the in-line services. This method of applying varying modulo arithmetic in response to varying numbers of head ends may be called "naïve hashing."

In the case of a redirected flow, the head ends may exchange signals with the PCRF 145 to re-anchor the subscriber state on the new head end. The PCRF may facilitate the saving and transfer of states for a given subscriber flow associated with a given service chain. In the event of a redirected flow as a subscriber is moved from association with, for example, service chain 1 to service chain 2, the PCRF may acquire the state from service chain 1 and apply it to service chain 2. Since each head end is the head of one or more service chains, and because service chains are not easily moved as they maintain state, subscriber flows may be served from multiple head ends. Redirected flows and resulting reconfigurations can occur because of failed head ends, the addition of new head ends, or the reduction in the number of head ends due to a reduction of capacity. The misdirection and resulting re-anchoring of subscriber flows may be called "churn."

One solution to the problem of churn with naïve hashing would have the FELB maintain a list of explicit associations between subscriber flows and head ends. The FELB 115 would maintain a host-based flow table (classifying based on source or destination IP address). The table would refer each subscriber flow to the next hop, i.e. head end. While such a solution is algorithmically possible, it is not computationally economical. A tier-1 cellular subscriber may maintain as many as 60-100 million subscribers over a handful of FELBs, thus leading to very large tables solely for maintaining subscriber flow steering and routing information. What is needed is a hashing technique that minimizes churn.

Figure 2:
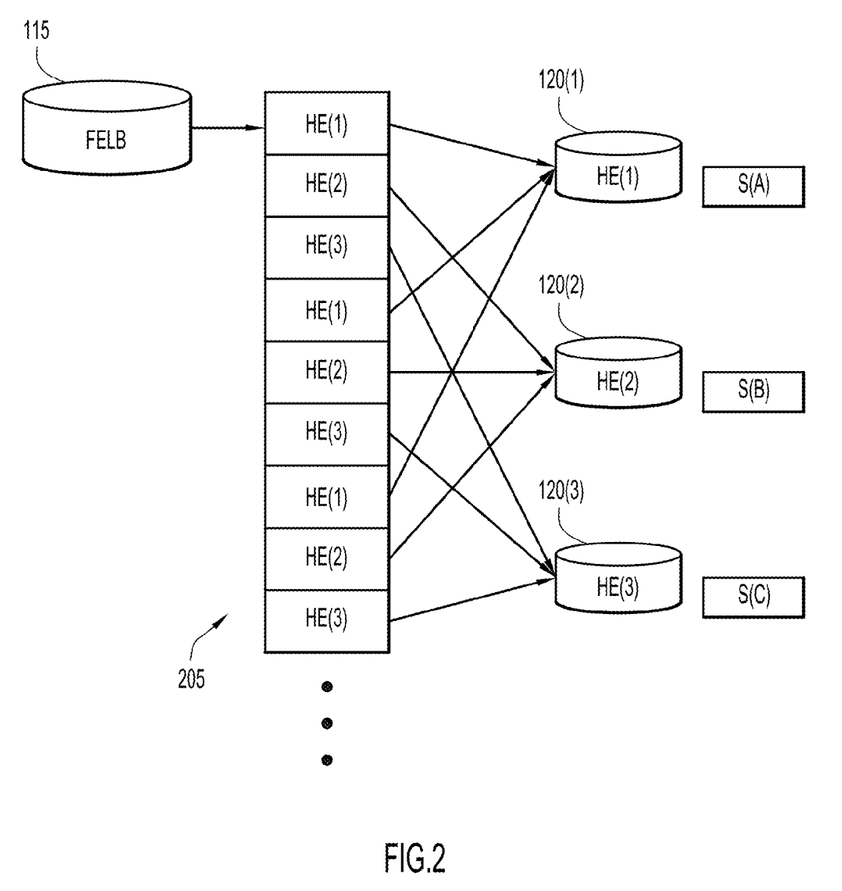
FIG. 2 shows an example block diagram depicting operations when hashing a subscriber flow from a primary load balancer to a plurality of secondary load balancers.

Techniques provided herein utilize a FELB with an indirect hash table with a static number of bins. As shown in FIG. 2, a level of indirection is added to the hash table 205 in the FELB 115 in order to maintain a fixed number of, for example, B hash bins. For a given number of head ends, for example three as shown in FIG. 2, pointers to each head end are distributed evenly in an alternating manner across the B bins. The number of B bins may be much larger than the expected number of head ends, both to allow for flexibility in the event of a large number of head ends, and to provide a more even distribution of head end pointers across the hash table 205. Further, as will be seen, a larger number of B bins in the indirect hash table reduces the churn. In the example shown in FIG. 2, subscriber flow S(A) is associated with head end 120(1), S(B) with 120(2), and so on. When traffic arrives at FELB 115, the FELB may use a packet identifier (or portion thereof) as a seed for a hashing function which uses modulo B arithmetic. The traffic may thus become associated with one of B bins in the hash table 205, which contains a pointer to one of the head ends. An advantage of having a static number of bins in the hash table is that the hash function is performed modulo B regardless of the number of head ends. This, as will be shown below, reduces the amount of churn when the number of head ends is modified, or a head end replacement or update occurs.

Figure 3:
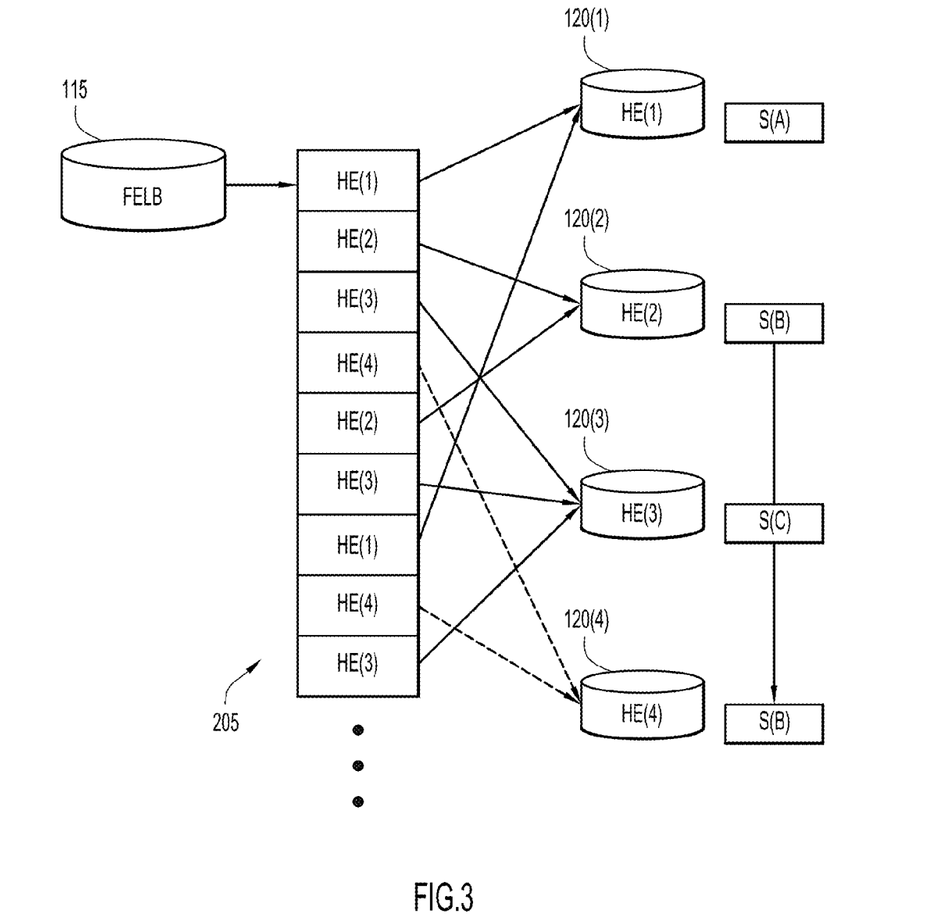
FIG. 3 shows an example block diagram depicting operations to create a new secondary load balancer.

FIG. 3 shows an example of how head ends may be added according to techniques presented herein. When increasing the number of head ends by one, the virtual machine and any associated service chains may be created, for example, either by an administrator or automatically by the controller 140. Pointers to the new head end, for example head end 120(4), may be uniformly distributed across the hash table 205. In the example shown in FIG. 3, pointer HE(4) overwrites the existing pointers every fourth bin. Thus, for any addition of an Nth head end, every Nth hash bin may be overwritten to achieve uniform and even distribution over the hash table 205. Given the large number of hash bins, an addition of an Nth head end may result in approximately 1/Nth of the hash table becoming pointers to the Nth head end.

Only those subscribers associated with hash bins that are updated during the reconfiguration are affected and redirected (i.e., misdirected) to the new added head end. For example, in FIG. 3, subscriber flow S(B) is redirected to head end 120(4). The aim is to keep the number of redirected subscribers to a minimum. To compare and contrast this technique to the naïve method, the typical number of re-anchoring operations in the naïve case may be determined. In the naïve hashing technique, when a new head end is added, the number of bins is augmented such that bins B=head ends N. Assuming there are M subscribers in the system, and that the hash function uniformly distributes subscribers across the bins, the number F of redirected subscribers is represented by equation (1):

$$F = M \times \left(1 - \frac{1}{(N+1)}\right) \quad (1)$$

$$F(N \to \infty) = M \quad (2)$$

As indicated by equation (2), as the number of head ends approaches infinity, the number of redirected subscribers approaches the number of subscribers. This is to say that, for large numbers of head ends, all of the subscribers are redirected.

In contrast, techniques presented herein use an intermediate hash bin array of B bins. In this case, the number of redirected subscribers F is represented by equation (3):

$$F = \left\lfloor \frac{B}{N+1} \right\rfloor \times \frac{M}{B} \quad (3)$$

If the size of the hash table is large, the number of redirected subscribers is represented by equation (4):

$$F(B \to \infty) = \frac{M}{N+1} \qquad (4)$$

As indicated by equation (4), as the number of bins approaches infinity, the number of redirected subscribers approaches the number of subscribers divided by the number of head ends plus one. Thus, the new technique allows for a dramatic reduction in the number of redirected subscribers. Further, in the naïve case, as the number of head ends increases, the number of redirected subscribers increases. In the techniques described herein, as the number of head ends increases, the number of redirected subscribers decreases. This means that, as the capacity of the load balancing system is increased, it only becomes more efficient. These functions and techniques apply similarly when reducing the number of bins. Formulas (1)-(4) may also change if the hashing function does not uniformly distribute subscribers across the bins.

To show equations (1) and (2), it can be assumed that the number of subscribers is distributed uniformly across the set of N head ends. This means that every head end carries a total of M/N subscribers. When enlarging the set of load balancers with an extra load balancer, the probability a subscriber is hashed to the same load balancer after reconfiguration is represented by 1/(N×(N+1)), yet there are N bins. Thus, the total number of redirected subscribers corresponds to equation (1). Equation (2) may be shown trivially given equation (1). Reducing the number of head ends by one is identical to increasing the number of head ends by one, except that initially there are N+1 head ends which are reduced to N head ends.

When using an intermediate array (hash table) of size B bins, the number of subscribers per bin B is represented by M/B. Also, when the number of head ends is increased by one, there are a total of |B/(N+1)| head ends replaced. This demonstrates equation (3). Similarly, reducing the set of load balancers implies going from N+1 to N load balancers with the same number of redirected subscribers. Equation (4) may be shown trivially given equation (3).

Head ends make themselves known to a FELB by way of a signaling and data plane protocol. If, for instance, an Interior Gateway Protocol (IGP) packet is used (e.g. Exterior Border Gateway Protocol (e-BGP)) to signal the availability of a head end, the IGP session can be used as an indicator of the availability of a head end. Moreover, bidirectional forwarding detection single-hop or multi-hop (SH-BFD or MH-BFD) may be used to test the liveliness of the head end. The hash table 205 may be set up by command line interface on the FELB 115.

Figure 4:
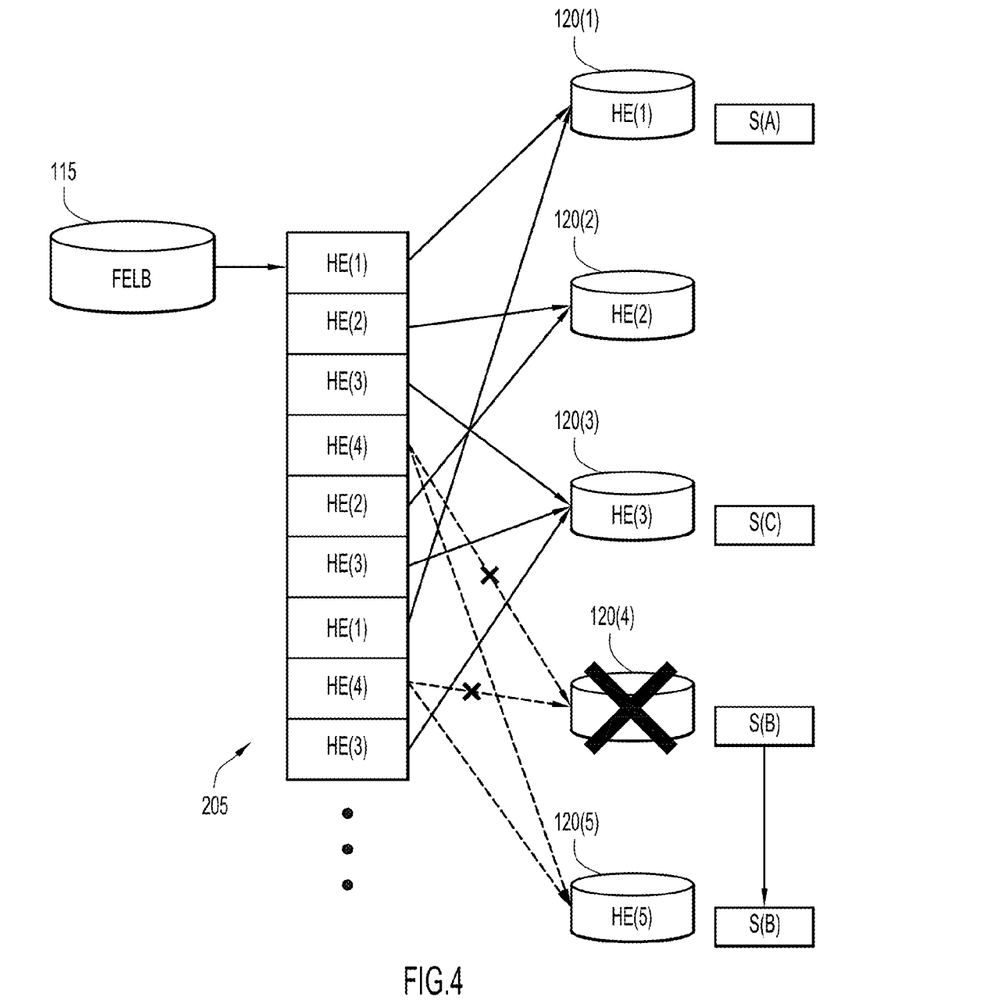
FIG. 4 shows an example block diagram depicting operations in the event of a failed secondary load balancer.

Techniques presented herein may also be applied in the event of a head end failure, as shown in FIG. 4. If a head end fails, for example head end 120(4), an N+1 recovery scheme may be implemented. If N represents the number of head ends, an additional backup head end may be always made available. If an active head end fails, rather than reducing the set of head ends, which would reduce the load balancing capacity of the system and result in a number of redirected subscribers represented by equations (1) and (2), a backup head end may be activated. This backup head end may be a virtual machine and may already have been instantiated, thus simply requiring a hash table pointer update. This hash table pointer update is depicted in FIG. 4, as pointers are changed to point to the backup head end 120(5) upon the failure of head end 120(4). Additionally, the state of subscriber flow S(B) may be moved from head end 120(4) to 120(5), in the manner discussed above. Using these techniques, the number of redirected subscribers is represented by equation (5):

$$F = \frac{M}{N} \qquad (5)$$

This may be shown by calculating the number of subscribers directed to a head end. By replacing a head end on a failure, all subscribers carried by the old head end need to be re-directed. If the hash function does not provide uniform distribution, the actual number of relocations may differ from equation (5). An operator or administrator may use a command line interface to configure this N+1 redundancy. In this particular case, the FELB would keep at least one head end in reserve. The FELB may request or seek to automatically locate a new backup head end in the event that the backup head end is made active.

Figure 5:
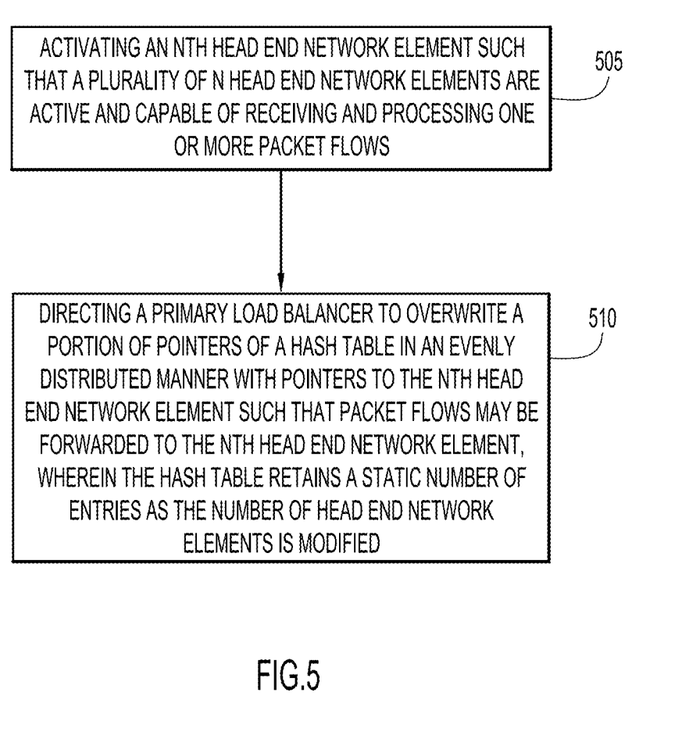
FIG. 5 shows a general example flow chart depicting operations when adding a new secondary load balancer.

FIG. 5 shows a general example flow chart depicting operations when adding a new secondary load balancer. At step 505, an Nth head end network element may be activated such that a plurality of N head end network elements are active and capable of receiving and processing one or more packet flows. At step 510, a primary load balancer may be directed to overwrite a portion of pointers of a hash table in an evenly distributed manner with pointers to the Nth head end network element such that packet flows may be forwarded to the Nth head end network element.

Figure 6:
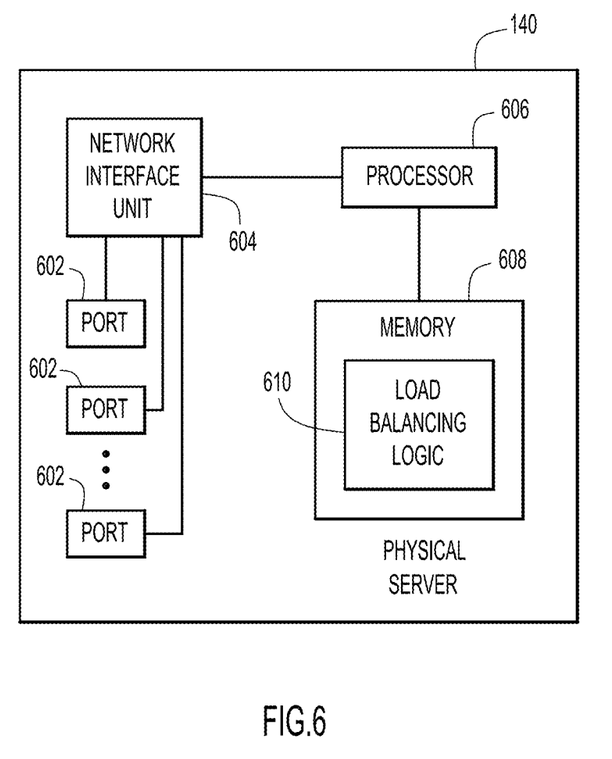
FIG. 6 shows an example block diagram of a physical device configured to perform sticky hierarchical load balancing according to techniques presented herein.

FIG. 6 shows an example block diagram of a physical device configured to perform sticky hierarchical load balancing according to techniques presented herein. The physical server 140 comprises, among other components, a plurality of network ports 602, a network interface unit 604, a processor 606 and a memory 608. The ports 602 are configured to receive network communications (e.g., packets) and to send network communications. The ports are coupled to the network interface unit 604. The network interface unit 604 enables packets to be received and forwarded by the physical server 140.

The network interface unit 604 is coupled to the processor 606. The processor 606 is, for example, a microprocessor or microcontroller that is configured to execute program logic instructions (i.e., software) for carrying out various operations and tasks of the physical server 140, as described herein. The functions of the processor 606 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 608 may comprise read only memory (ROM), random access memory (RAM), magnetic disk storage media devices, optical storage media devices, flash memory devices, electrical, optical, or other physical/tangible (non-transitory) memory storage devices. The memory 608 stores software instructions and data/information for load balancing logic 610, which contains instructions for carrying out the techniques presented herein when executed by processor 606. Thus, in general, memory 608 may comprise one or more computer readable storage media (e.g., a memory storage device) encoded with software comprising computer executable instructions and when the software is executed (e.g., by the processor 606), it is operable to perform the techniques described herein for load balancing logic 610.

The load balancing logic 610 may take any of a variety of forms, so as to be encoded in one or more tangible computer readable memory media or storage devices for execution, such as fixed logic or programmable logic (e.g., software/computer instructions executed by a processor). The processor 606 may be an ASIC that comprises fixed digital logic, a general purpose processor, or a combination thereof.

Thus, a solution is provided which reduces churn in a sticky hierarchical load balancing system when a head end is added, removed, or replaced. An advantage of using an intermediate hash array in the FELB is that enlarging or reducing the number of head ends does not cause excessive redirected subscribers, or churn. Further, the number of re-anchoring operations because of redirected subscribers is inversely proportional to the number of head ends. As a result, the situation where all of nearly all of the subscribers are redirected in the event of an increase in capacity (adding another head end, also known as adding another ECMP leg) can be avoided. Techniques shown herein provide stickiness of subscribers to head ends for the majority of subscribers.

In summary, a method is provided, comprising: activating an Nth head end network element such that a plurality of N head end network elements are active and capable of receiving and processing one or more packet flows; and directing a primary load balancer to overwrite a portion of pointers of a hash table in an evenly distributed manner with pointers to the Nth head end network element such that packet flows may be forwarded to the Nth head end network element, wherein the hash table retains a static number of entries as the number of head end network elements is modified.

An apparatus is also provided comprising: a plurality of network ports; a network interface unit coupled to the plurality of network ports; a processor coupled to the network processor unit, and configured to: activate an Nth head end network element such that a plurality of N head end network elements are active and capable of receiving and processing one or more packet flows; and direct a primary load balancer to overwrite a portion of pointers of a hash table in an evenly distributed manner with pointers to the Nth head end network element such that packet flows may be forwarded to the Nth head end network element, wherein the hash table retains a static number of entries as the number of head end network elements is modified.

A computer-readable storage media is provided that is encoded with software comprising computer executable instructions and when the software is executed operable to: activate an Nth head end network element such that a plurality of N head end network elements are active and capable of receiving and processing one or more packet flows; and direct a primary load balancer to overwrite a portion of pointers of a hash table in an evenly distributed manner with pointers to the Nth head end network element such that packet flows may be forwarded to the Nth head end network element, wherein the hash table retains a static number of entries as the number of head end network elements is modified.

Although the techniques described herein as embodied in one or more specific examples, it is nevertheless not intended to be limited to the details shown, since various modifications and structural changes may be made therein within the scope and range of equivalents of the claims. Accordingly, it is appropriate that the appended claims be construed broadly as set forth in the following claims.

What is claimed is:

1. A method comprising:
in a network having N−1 head end network elements, activating a new head end network element such that the new head end network element is one of N head end network elements that are active and capable of receiving and processing one or more packet flows, where N is greater than two; and
directing a primary load balancer to overwrite a portion of pointers of a hash table in an evenly distributed manner with one or more pointers to the new head end network element such that packet flows are forwarded to the new head end network element, wherein the hash table includes pointers for a plurality of head end network elements and retains a static number of entries as the number of head end network elements is modified, and wherein the static number of entries is greater than N;
wherein directing includes directing the primary load balancer to overwrite every Nth entry in the hash table with a pointer to the new head end network element, such that packet flows are forwarded to the new head end network element.

2. The method of claim 1, wherein each of the N head end network elements is a secondary load balancer configured to classify the one or more packet flows for distribution to one or more service chains associated with a head end network element and configured to forward data packet flows to the one or more service chains associated with the head end network element, and further comprising acquiring state information only from one or more service chains associated with overwritten hash table entries and providing the state information to the new head end network element.

3. The method of claim 1, further comprising:
detecting that an association between a given data packet flow and a first head end network element has been changed to an association between the given packet flow and a second head end network element;
in response to detecting that the association has changed, acquiring state information from a first service chain formerly associated with the first head end network element; and
providing the state information to a second service chain associated with the second head end network element.

4. The method of claim 1, wherein the hash table includes a plurality of pointers to a first head end network element, and further comprising:
detecting a failure of the first head end network element from the N head end network elements; and
directing the primary load balancer to overwrite in the hash table a first occurrence of a pointer to the first head end network element, and every Nth entry in the hash table after the first occurrence, with a pointer to a second head end network element such that packet flows are forwarded to the second head end network element.

5. The method of claim 4, further comprising:
in response to detecting the failure, acquiring state information from a first service chain associated with the first head end network element; and
providing the state information to a second service chain associated with the second head end network element.

6. The method of claim 1, wherein the hash table includes a plurality of pointers to each of the N head end network elements, and further comprising:
removing a head end network element from the N head end network elements; and directing the primary load balancer to overwrite every Nth entry in the hash table, beginning with a first occurrence of a pointer to the removed head end network element, with a pointer that does not point to the removed head end network element, such that only pointers to N−1 head end network elements remain.

7. The method of claim 1, wherein the hash table includes a plurality of pointers for each head end network element.

8. An apparatus comprising:
a plurality of network ports;
a network interface unit coupled to the plurality of network ports;
a processor coupled to the network interface unit, and configured to:
in a network having N−1 head end network elements, activate a new head end network element such that the new head end network element is one of N head end network elements that are active and capable of receiving and processing one or more packet flows, where N is greater than one two; and
direct a primary load balancer to overwrite a portion of pointers of a hash table in an evenly distributed manner with one or more pointers to the new head end network element such that packet flows are forwarded to the new head end network element, wherein the hash table includes pointers for a plurality of head end network elements and retains a static number of entries as the number of head end network elements is modified, and wherein the static number of entries is greater than N;
wherein the processor is further configured to direct the primary load balancer to overwrite every Nth entry in the hash table with a pointer to the new head end network element, such that packet flows are forwarded to the new head end network element.

9. The apparatus of claim 8, wherein each of the N head end network elements is a secondary load balancer configured to classify the one or more packet flows for distribution to one or more service chains associated with a head end network element and configured to forward data packet flows to the one or more service chains associated with the head end network element, and wherein the processor is configured to acquire state information only from one or more service chains associated with overwritten hash table entries and provide the state information to the new head end network element.

10. The apparatus of claim 8, wherein the processor is further configured to:
detect that an association between a given data packet flow and a first head end network element has been changed to an association between the given packet flow and a second head end network element;
in response to detecting that the association has changed, acquire state information from a first service chain formerly associated with the first head end network element; and
provide the state information to a second service chain associated with the second head end network element.

11. The apparatus of claim 8, wherein the hash table includes a plurality of pointers to a first head end network element, and wherein the processor is further configured to:
detect a failure of the first head end network element from the N head end network elements; and
direct the primary load balancer to overwrite in the hash table a first occurrence of a pointer to the first head end network element, and every Nth entry in the hash table after the first occurrence, with a pointer to a second head end network element such that packet flows are forwarded to the second head end network element.

12. The apparatus of claim 11, wherein the processor is further configured to:
in response to detecting the failure, acquire state information from a first service chain associated with the first head end network element; and
provide the state information to a second service chain associated with the second head end network element.

13. The apparatus of claim 8, wherein the hash table includes a plurality of pointers to each of the N head end network elements, and wherein the processor is configured to:
remove a head end network element from the N head end network elements; and
direct the primary load balancer to overwrite every Nth entry in the hash table, beginning with a first occurrence of a pointer to the removed head end network element, with a pointer that does not point to the removed head end network element, such that only pointers to N−1 head end network elements remain.

14. The apparatus of claim 8, wherein the hash table includes a plurality of pointers for each head end network element.

15. A non-transitory computer-readable storage media encoded with software comprising computer executable instructions and when the software is executed operable to:
in a network having N−1 head end network elements, activate a new head end network element such that the new head end network element is one of N head end network elements that are active and capable of receiving and processing one or more packet flows, where N is greater than two; and
direct a primary load balancer to overwrite a portion of pointers of a hash table in an evenly distributed manner with one or more pointers to the new head end network element such that packet flows are forwarded to the new head end network element, wherein the hash table includes pointers for a plurality of head end network elements and retains a static number of entries as the number of head end network elements is modified, and wherein the static number of entries is greater than N;
wherein the instructions are operable to direct the primary load balancer to overwrite every Nth entry in the hash table with a pointer to the new head end network element, such that packet flows are forwarded to the new head end network element.

16. The computer-readable storage media of claim 15, wherein each of the N head end network elements is a secondary load balancer configured to classify the one or more packet flows for distribution to one or more service chains associated with a head end network element and configured to forward data packet flows to the one or more service chains associated with the head end network element, and further comprising instructions operable to acquire state information only from one or more service chains associated with overwritten hash table entries and to provide the state information to the new head end network element.

17. The computer-readable storage media of claim 15, further comprising instructions operable to:
detect that an association between a given data packet flow and a first head end network element has been changed to an association between the given packet flow and a second head end network element;

in response to detecting that the association has changed, acquire state information from a first service chain formerly associated with the first head end network element; and provide the state information to a second service chain associated with the second head end network element.

18. The computer-readable storage media of claim 15, wherein the hash table includes a plurality of pointers to a first head end network element, and further comprising instructions operable to:

detect a failure of the first head end network element from the N head end network elements; and direct the primary load balancer to overwrite in the hash table a first occurrence of a pointer to the first head end network element, and every Nth entry in the hash table after the first occurrence, with a pointer to a second head end network element such that packet flows are forwarded to the second head end network element.

19. The computer-readable storage media of claim 18, further comprising instructions operable to:

in response to detecting the failure, acquire state information from a first service chain associated with the first head end network element; and provide the state information to a second service chain associated with the second head end network element.

20. The computer-readable storage media of claim 15, wherein the hash table includes a plurality of pointers for each head end network element.

* * * * *